BEST AVAILABLE COPY

R. A. DURLAND.

VALVE SPRING COMPRESSOR.

APPLICATION FILED MAR. 21, 1918.

Reissued Apr. 29, 1919. 14,640.

Inventor,

Ralph A. Durland

By his Attorney

E. W. Fairbank

29. METAL WORKING.
216

UNITED STATES PATENT OFFICE.

RALPH A. DURLAND, OF WASHINGTONVILLE, NEW YORK, ASSIGNOR TO JAMES A. ABELES, OF NEW YORK, N. Y.

VALVE-SPRING COMPRESSOR.

14,640. Specification of Reissued Letters Patent. Reissued Apr. 29, 1919.

Original No. 1,236,826, dated August 14, 1917, Serial No. 134,421, filed December 1, 1916. Application for reissue filed March 21, 1918. Serial No. 223,873.

*To all whom it may concern:*

Be it known that I, RALPH A. DURLAND, a citizen of the United States, residing at Washingtonville, Orange county, New York, have invented certain new and useful Improvements in Valve-Spring Compressors, of which the following is a specification.

This invention is primarily intended for lifting and compressing the valve springs of an internal combustion engine and holding them under compression so that the valves and valve stems may be conveniently removed or replaced, or the valves ground in their seats, but may be employed for compressing other springs.

One important object of my invention is to enable the valve springs of two or more valves to be simultaneously compressed by a single operation of the device, thereby materially reducing the time and labor required in removing, replacing, or regrinding of the valves. To accomplish this result, I provide a spring compressing or lifting member having means for engaging with two or more valve springs or spring seats, and having operating mechanism so connected thereto that equal compressing action may be transmitted to both or all of the springs at the same time.

A further and most important object of my invention is to provide an operating mechanism which will coöperate with the spring compressing or lifting member and a stationary element, usually a part of the engine and which, when moved to final or limiting position, will automatically lock itself against either further or return movement.

By means of my invention the very simple and easy operation, involving merely the placing of the device in position and the one-way movement of a part thereof to limiting and self-locking position, compresses the spring and automatically locks it so that it may be held locked indefinitely while the valve and valve stem are released for removal or re-grinding. To secure this object of my invention, I provide an operating mechanism which includes a pivoted handle member for coöperation with the spring compressing or lifting and holding member, said handle member having a part intermediate of its ends for continuous engagement with a stationary part of the engine during the swinging of the handle member about its pivotal connection and during the compression or lifting of the spring.

In its preferred embodiment, this engine engaging part is in the form of a link pivoted to the handle member intermediate of the ends of the latter so that said link and the portion of the handle member between the link and the spring compressing member, which acts as a second link, form a toggle. The arrangement of the pivots and the shape of the parts is such that the pivot of the toggle joint between the two links passes dead-center but further movement is prevented by the engagement of one of the moving parts with a limiting stop. Thus, when the handle member is moved to limiting position, the toggle straightens to lift the spring compressing member until the joint passes dead-center, after which a slight further movement of the joint automatically locks the parts against further or return movement. The handle, which is integral with one of the links, is preferably so formed that it engages with a stationary part of the engine just after the toggle joint passes dead-center and thus serves as the stop. This also permits the operating lever or handle, when in locking position, to lie closely adjacent to a part of the engine and be protected against accidental displacement by the operator when the valve stems are out and the springs held under compression.

I have succeeded in accomplishing the desired results by few parts, simple in construction, easy to operate, and durable and well adapted to withstand the rough or careless handling to which devices of this character are often subjected. All of the parts may be formed from sheet metal stamped to final form by a very small number of operations.

For a full description of one embodiment of the invention, reference is to be had to the following description and the accompanying drawings, wherein is illustrated the preferred form of my invention, and in which—

Figure 1:
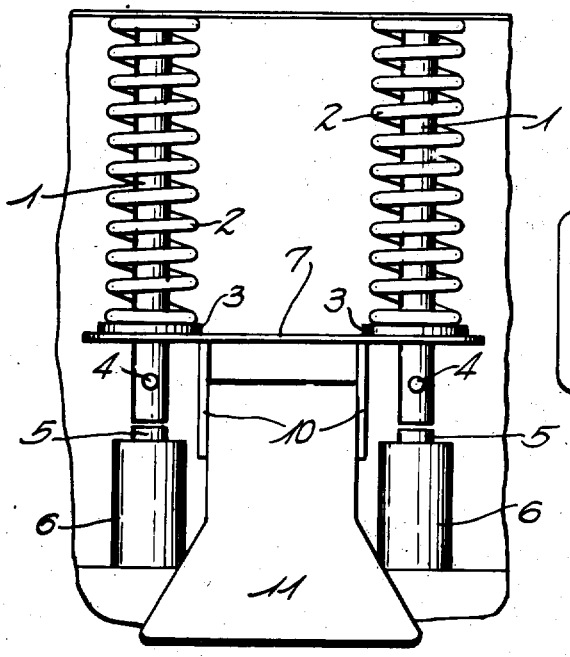
Figure 1 is a fragmentary side elevation of a portion of an internal combustion engine showing my improved device applied thereto and with the springs locked under compression.
Figure 2:
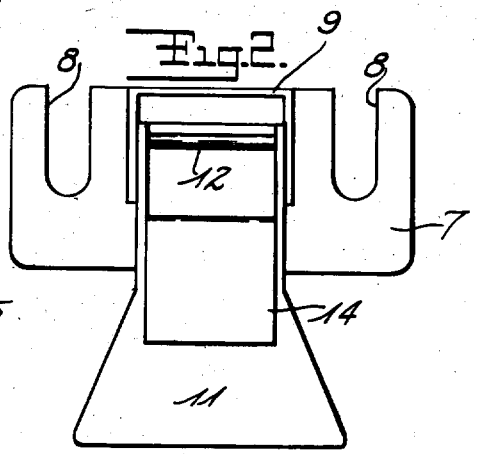
Fig. 2 is an inverted plan view with the parts in folded position.

In the accompanying drawings, in which like numerals of reference indicate corresponding parts throughout the several views, I have shown a portion of a gasolene motor or internal combustion engine of a common type, to facilitate a clear understanding of the operation of my device. This engine construction, which forms no portion of my invention, is provided with valve stems 1 normally pressed downwardly by compression springs 2 to hold the valves to their seats. The springs at their upper ends engage with the valve casings or other rigid part of the engine, while at their lower ends they rest upon valve spring seats 3 slidably mounted upon the valve stems 1. Beneath each valve seat 3 there is provided a pin 4 extending transversely through the valve stem and against which the seat normally bears for forcing the valve stem downwardly, thus holding the valve (not shown) in closed position. Valve lifting rods 5 extend upwardly through the casing of the motor in alinement with the valve stems and are guided by cylindrical sleeves 6, one being provided for each rod 5. As will be understood, these valve lifting rods 5 are intermittently reciprocated by cams or other mechanism for lifting the valve rods and opening the valves at the proper times against the action of the springs.

In this specific form of my device adapted for use with this form of motor, I provide a valve spring lifting, compressed and supporting member in the form of a plate 7 substantially rectangular in form and having transverse slots 8 extending inwardly from one edge thereof to approximately midway between the opposite side edges of the plate. These slots 8 are spaced apart to a distance equal to the distance between the valve stems 1 so that the valve stems may be received within the slots when the plate is moved substantially in its own plane in a horizontal direction into position beneath the valve spring seats 3.

For moving the lifting or spring-supporting plate to compress the springs, and for locking the plate in lifted position, I provide an operating mechanism here shown as including an operating lever 11. This has one end serving as a handle and the opposite end pivotally connected to the plate 7 between the two slots 8. As a simple and desirable way of effecting this pivotal connection, I provide the lifting plate 7 with a pair of depending, spaced, parallel flanges or ears 10, and provide the sides of the operating lever 11 with parallel flanges or ears 13 fitting between the flanges or ears 10, and pivotally connected to them by a pivot pin 12. The flanges or ears 10 are illustrated as having their vertical edges integral with a guide flange or plate 9 and their upper horizontal edges engaging with the upper surface of the plate 7. The guide plate 9 has its upper edge integral with the inner edge of the plate 7 between the two slots, the said guide plate extending from the lifting plate in a plane substantially at right angles to the plane of the latter.

The operating lever 11, intermediate of the handle end and the pivot pin 12, has means for engaging with a stationary part of the engine and acting as a fulcrum or support during the swinging of the lever to thereby effect a raising of the spring compressing member or lifting plate 7. This part is shown in the form of a fulcrum lever or link 14, one end of which is pivotally connected to the lever 11. As a simple means of effecting this pivotal connection, the end of the fulcrum lever or link 14 has a rolled portion encircling a pivot pin 15 carried by the ears or flanges 13 of the lever 11.

The portion of the operating lever 11 between the two pivot pins 12 and 15 constitutes one link and the fulcrum lever 14 constitutes the other link of a toggle, the joint being at the pivot pin 15. By holding the lower end of the link 14 against downward movement and by moving the joint of the toggle toward a line connecting the two ends of the toggle, the toggle will be straightened and the lifting plate 7, which is carried by the upper end of the toggle, will be raised to effect the desired spring compressing action.

It will be understood, of course, that the precise construction of the device may have to be varied to conform to the different designs found in different types of gasolene motors or internal combustion engines.

Figure 3:
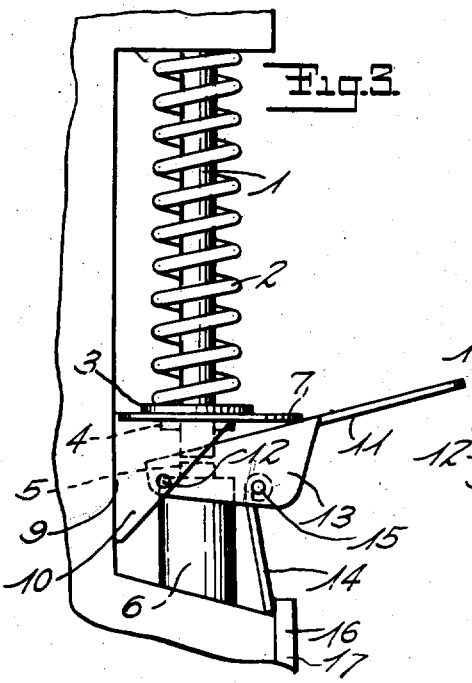
Fig. 3 is an edge view of the device applied to the valve springs in the position it assumes immediately before the lifting operation.
Figure 4:
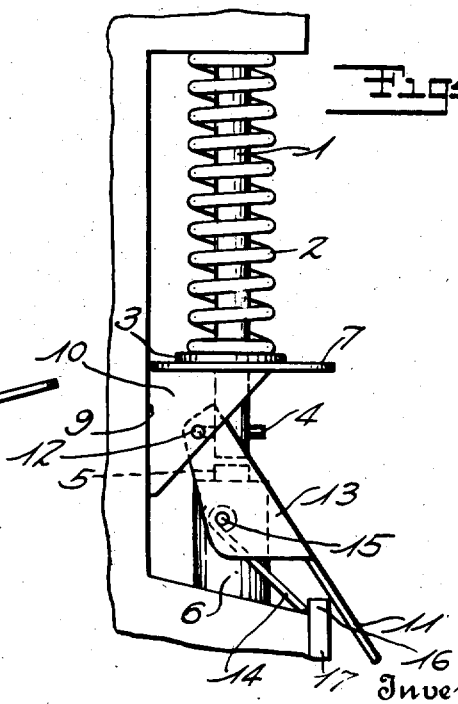
Fig. 4 is a view similar to Fig. 3 but with the spring compressed and the parts automatically locked as in Fig. 1.

The specific form illustrated is adapted for use in connection with a type of motor now in extensive use in Ford cars. This motor is provided with a lip 16 formed by a slight extension of a cover plate 17. In using the device in connection with this type of engine, the lifting plate is first placed in position where the slots will receive the valve stems 1, the plate extending beneath the valve spring seats 3 so that said seats may rest upon the plate. This may be done by forcing the plate in between the pins 4 and the seat, or if the pins be sufficiently short, or the slots sufficiently wide, or the pins extended lengthwise of the slots, the plate may be inserted with the pins in the slots. The back edge of the plate 7 may limit the initial movement of the plate and contact with the side wall of the motor, the flange 9 guiding the plate 7 during its vertical movement. The lower end of the toggle link or fulcrum lever 14 is placed in position behind the lip as shown in Fig. 3 of the drawing with the lever 11 extending outwardly as there shown. The lever may then be pressed downwardly until it assumes the position shown in Fig. 4 of the drawing. This will move the lifting plate so that the spring seat 3 will be forced upwardly, thereby pressing the springs 2.

It will be noted that before the lever 11 is stopped by coming into contact with the lip 16 or the side of the engine, the pivot pin 15, constituting the joint of the toggle, will cross the dead-center between the pivot 12 and the lower end of the link 14. The further movement of the toggle joint to final position and the movement of the lever into contact with the lip 16 will automatically lock the operating mechanism against any further movement or against return movement and the compression of the spring will lock the operating lever 11 against the lip 16. The lifting plate, being retained and locked in raised position, access may be gained to the pins 4 of the valve stems and these pins may be removed in case it is desired to remove the valves and valve stems, or the valves and valve stems may be rotated or ground in their seats without being held against said seats by the tension of the springs.

From the foregoing, it will be observed that a very simple and durable valve spring compressor has been provided, the details of which are embodied in the preferred form illustrated. I desire it to be understood that changes in the details of the construction may be made without departing from the spirit of the invention or the scope of the claims hereunto appended.

I claim:

1. A valve spring compressor comprising a plate having a guide flange depending substantially at right angles from one edge thereof, and operating means pivotally mounted on the guide flange and including a fulcrum lever adapted to be locked to maintain said plate in raised position when said operating means is actuated.

2. A valve spring compressor comprising a plate adapted to support a valve spring seat, said plate having a flange integrally formed therewith and extending substantially at right angles thereto, a lever pivotally mounted on said flange, and a fulcrum lever pivotally carried by said first mentioned lever, said levers being adapted to automatically lock against movement and hold said plate in raised position when said first mentioned lever is pivotally moved to one limiting position.

3. A valve spring compressor comprising a valve spring support having a guiding flange integrally formed therewith and extending at right angles thereto, an operating lever pivotally secured to said support, and means associated with said lever whereby said support may be raised to compress the spring and lock it in raised position when said operating lever is depressed to the limiting position.

4. A valve spring compressor comprising a valve spring support, a pair of pivotally connected links, one of said links having one end pivotally connected to said support and the other of said links having one end adapted for engagement with a stationary element, means for moving said links relatively to each other to elevate said support and compress the spring, and means for locking said links against further or return movement after a predetermined movement of said operating means.

5. A valve spring compressor comprising a valve spring support, a pair of pivotally connected links constituting a toggle, and means for moving the joint of said toggle past dead-center to compress the spring and lock said support against return movement.

6. A valve spring compressor comprising a member adapted to support a valve spring seat, a toggle including a pair of pivotally connected links, one link having one end pivotally connected to said member and the other link having one end adapted for engagement with a stationary element, and an operating member formed integral with one of said links for straightening the toggle to a point past dead-center and elevating and locking said first mentioned member.

7. A valve spring compressor comprising a member adapted to support a valve spring seat, and a lever pivoted thereto, said lever having fulcrum means intermediate of its ends for engaging with a stationary element to effect the bodily movement of said member during the swinging of said lever and the locking of said member against return movement when said lever is in final limiting position.

8. A valve spring compressor for internal combustion engines, comprising a member adapted to support a valve spring seat and having an aperture to receive a valve stem, and a lever pivoted to said member, said lever having fulcrum means intermediate of its ends for engagement with a stationary part of the engine, during the swinging of said lever to effect the raising of said member, said means serving to lock said lever against return movement when said lever is in maximum raised position.

9. A valve spring compressor comprising a support for a valve spring seat, a toggle connected thereto, and means for straightening the toggle to a point past dead center to raise said support and lock the latter against return movement.

10. A valve spring compressor adapted for use in connection with the valve stems and springs of an internal combustion engine, comprising a plate provided with slots to receive two of the valve stems, the upper surface of said plate being adapted to support the ends of said valve springs, and means carried by said plate and adapted to engage with a portion of the motor for imparting a lifting motion to said plate.

11. A valve spring compressor adapted for use in connection with the valve stems and springs of an internal combustion engine, comprising a lifting plate provided with slots extending inwardly from one edge of the plate for receiving a pair of said valve stems, the upper surface of the plate being adapted to engage with and support the lower ends of the valve springs, depending flanges carried by the plate and disposed between the stems, and means pivotally secured to said flanges and adapted to engage with a portion of the engine beneath said springs and adapted for manual operation for imparting a lifting motion to said plate.

12. A valve spring compressor adapted for use in connection with the valve stems and springs of a motor, comprising a plate having end portions adapted to embrace two of said valve stems and support the ends of the corresponding springs, a guide carried by said plate and adapted to engage with the motor between two of said stems, and an operating lever pivotally carried by said plate, said lever having a part adapted to engage a portion of the motor and providing a fulcrum for the lever whereby a lifting motion may be imparted to the plate when said lever is depressed.

13. A valve spring compressor adapted for use in connection with the valve stems and springs of a motor, comprising a plate having its end portions adapted to receive two of said stems and support the ends of the corresponding springs, an operating lever pivotally secured to said plate midway between said stems, said lever having side flanges intermediate of its ends and means pivotally associated with said flanges and adapted to engage a portion of the motor to provide a fulcrum for the lever whereby a lifting motion may be imparted to said plate.

14. A valve spring compressor adapted for use in connection with the valve stems and springs of a motor, comprising a plate having its end portions adapted to receive two of said stems and support the ends of the corresponding springs, an operating lever pivotally secured to said plate midway between said stems, said lever having side flanges intermediate of its ends and means pivotally associated with said flanges and adapted to engage a portion of the motor to provide a fulcrum for the lever whereby a lifting motion may be imparted to said plate, said last mentioned means serving to lock said plate against return movement when said lever has been depressed to the limiting position.

15. A valve spring compressor comprising a plate having end portions adapted to support separate valve springs, a lever pivoted to the under side of said plate intermediate of the ends of the latter, and a link having one end pivoted to said lever intermediate of the ends of the latter, said lever and link being so formed and the pivotal connections being so positioned in respect to each other that the free end of said link may be caused to engage with a stationary element and the plate raised by a swinging movement of said lever and locked against return movement when said lever reaches its limiting position.

Signed at Washingtonville, in the county of Orange, and State of New York, this 14th day of March, 1918.

RALPH A. DURLAND.

Copies of this patent may be obtained for five cents each, by addressing the "Commissioner of Patents, Washington, D. C."